United States Patent
Pflueger et al.

(10) Patent No.: US 12,421,032 B2
(45) Date of Patent: Sep. 23, 2025

(54) STORAGE AND RETRIEVAL UNIT AND METHOD FOR RETRIEVING AN OBJECT FROM A SHELF OF A SHELF STORAGE SYSTEM

(71) Applicant: Dambach Lagersysteme GmbH & Co. KG, Bischweier (DE)

(72) Inventors: Thomas Pflueger, Karlsruhe (DE); Franz Brutler, Gaggenau (DE)

(73) Assignee: Dambach Lagersysteme GmbH & Co KG, Bischweier (DE)

( * ) Notice: Subject to any disclaimer, the term of this patent is extended or adjusted under 35 U.S.C. 154(b) by 156 days.

(21) Appl. No.: 18/137,582

(22) Filed: Apr. 21, 2023

(65) Prior Publication Data

US 2023/0257196 A1    Aug. 17, 2023

Related U.S. Application Data

(63) Continuation of application No. PCT/EP2021/078749, filed on Oct. 18, 2021.

(30) Foreign Application Priority Data

Oct. 23, 2020    (DE) .................... 10 2020 127 921.3

(51) Int. Cl.
  *B65G 1/04*    (2006.01)
(52) U.S. Cl.
  CPC ......... *B65G 1/0435* (2013.01); *B65G 1/0421* (2013.01)
(58) Field of Classification Search
  CPC ........ B65G 1/0435; B65G 1/0421; B66F 9/14
  See application file for complete search history.

(56) References Cited

U.S. PATENT DOCUMENTS

| 3,659,733 A | 5/1972 | Sinclair et al. |
| 3,809,259 A * | 5/1974 | Pipes .................. B65G 1/0435 |
| | | 414/280 |

(Continued)

FOREIGN PATENT DOCUMENTS

| AT | 37343 E | 12/1985 |
| DE | 2121114 A1 | 6/1972 |

(Continued)

OTHER PUBLICATIONS

International Search Report dated Jan. 28, 2022 in corresponding application PCT/EP2021/078749.

*Primary Examiner* — Kaitlin S Joerger
(74) *Attorney, Agent, or Firm* — Muncy, Geissler, Olds & Lowe, P.C.

(57) ABSTRACT

A storage and retrieval unit having a carriage which can be moved along a linear guide arranged on a floor in a shelf aisle in the direction of an X axis and which supports a vertical mast which extends perpendicular to the X axis in the direction of a vertical Y axis. A load receiver is mounted by one end only on a support device and can be moved vertically to a shelf compartment along the mast together with the support device, and inserted in the direction of a Z axis running perpendicular to the X axis and perpendicular to the Y axis into a shelf compartment, and the pulled back out of the same. The load receiver is additionally pivotable about a pivot axis $X_1$ running parallel to the X axis, such that it can be brought into a position inclined downward towards the floor.

6 Claims, 10 Drawing Sheets

(56) References Cited

U.S. PATENT DOCUMENTS

| | | | | |
|---|---|---|---|---|
| 3,854,616 | A | * 12/1974 | Willis | B65G 1/0407 |
| | | | | 414/607 |
| 4,007,846 | A | * 2/1977 | Pipes | B65G 1/0435 |
| | | | | 414/280 |
| 6,758,649 | B1 | 7/2004 | Scordilis | |
| 2006/0280585 | A1 | 12/2006 | Passeri et al. | |
| 2018/0050868 | A1 | * 2/2018 | Overfield | B65G 1/0435 |
| 2020/0102196 | A1 | 4/2020 | Saleh | |

FOREIGN PATENT DOCUMENTS

| | | | |
|---|---|---|---|
| DE | 3731847 | A1 | 4/1989 |
| DE | 3735607 | C1 | 5/1989 |
| DE | 4218416 | A1 | 12/1993 |
| DE | 4412442 | A1 | 1/1996 |
| DE | 19601953 | C1 | 6/1997 |
| EP | 3441327 | A1 * | 2/2019 |
| ES | 2394268 | A1 * | 1/2013 |
| JP | H04121925 | U | 10/1992 |

* cited by examiner

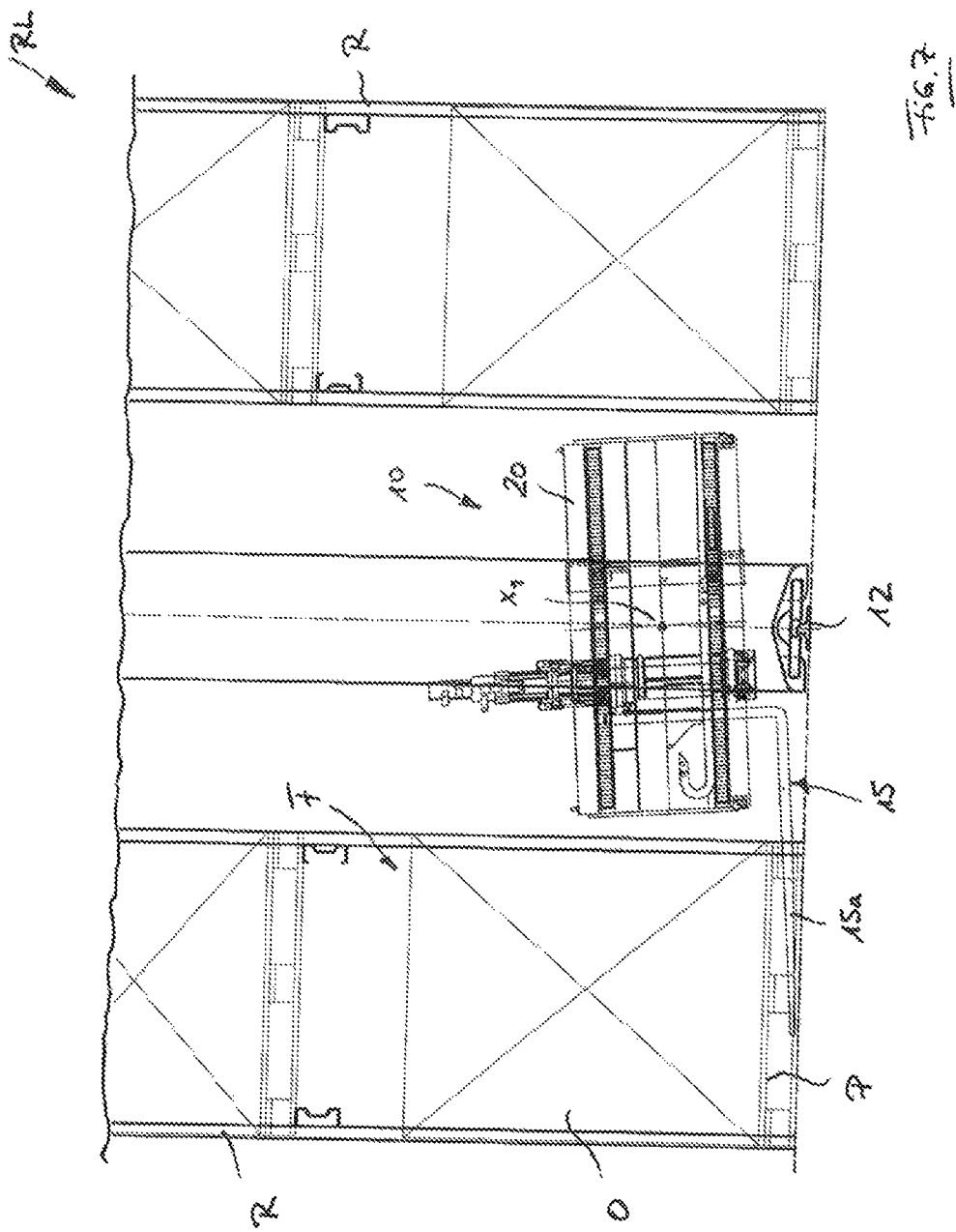

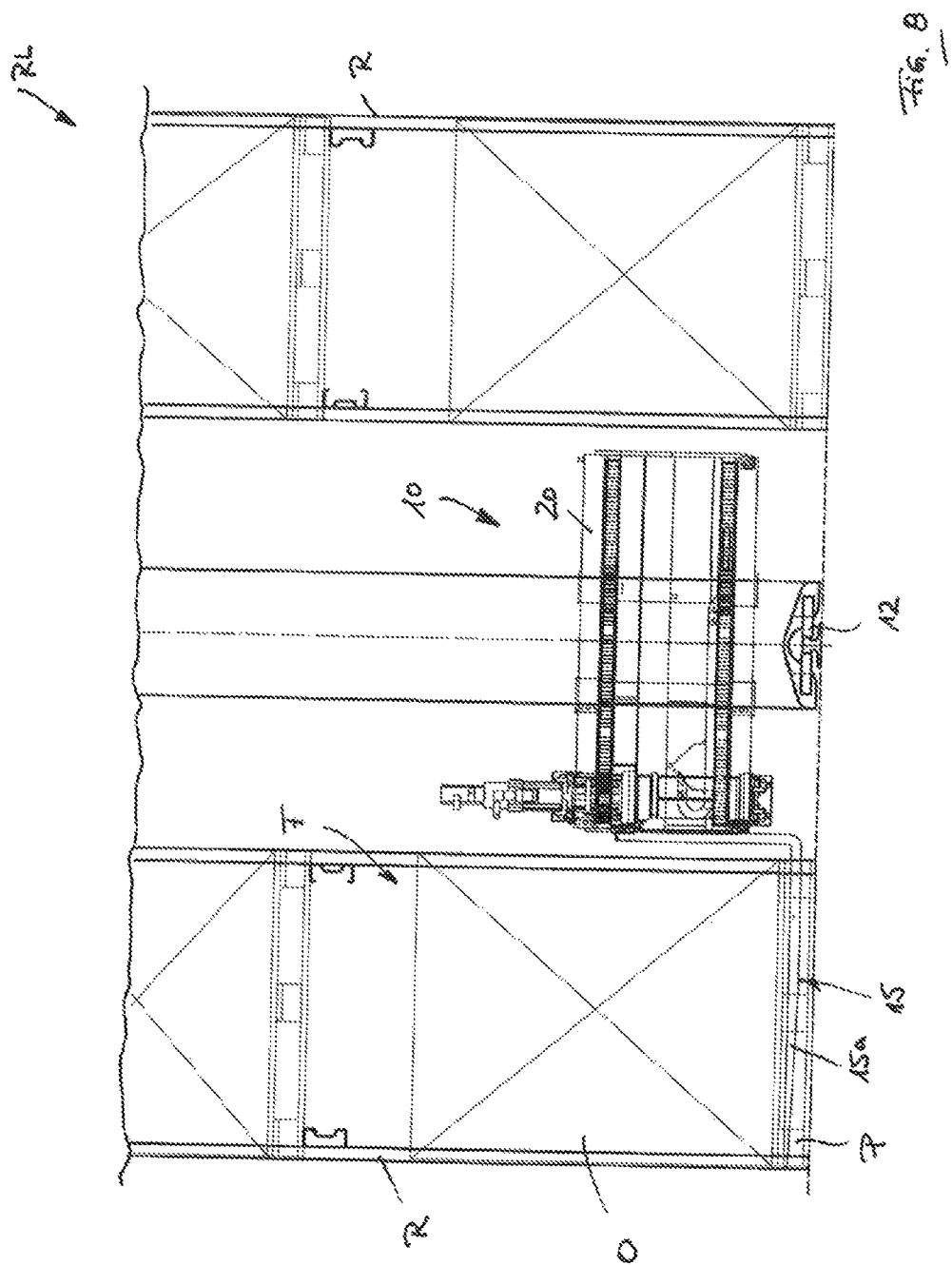

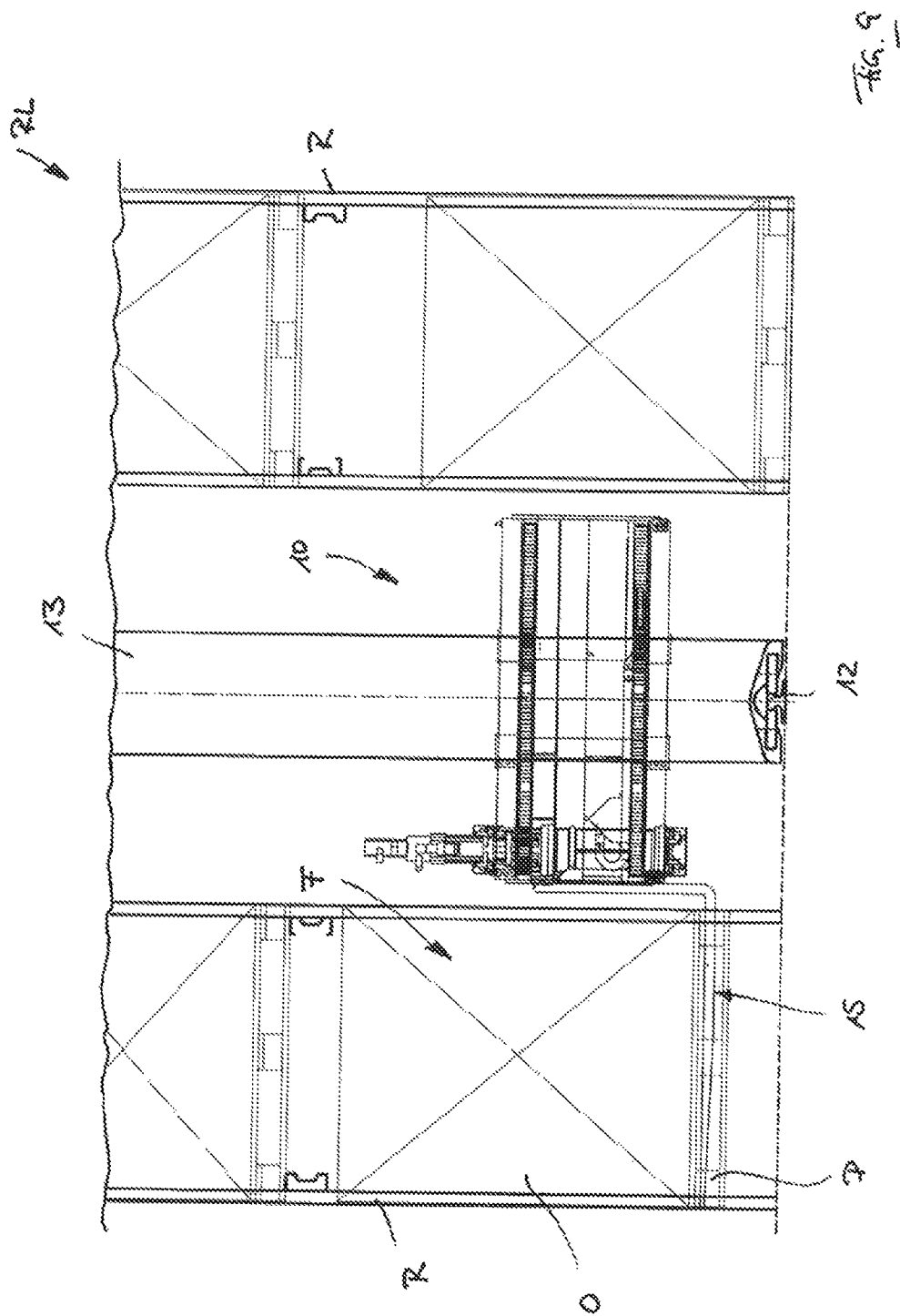

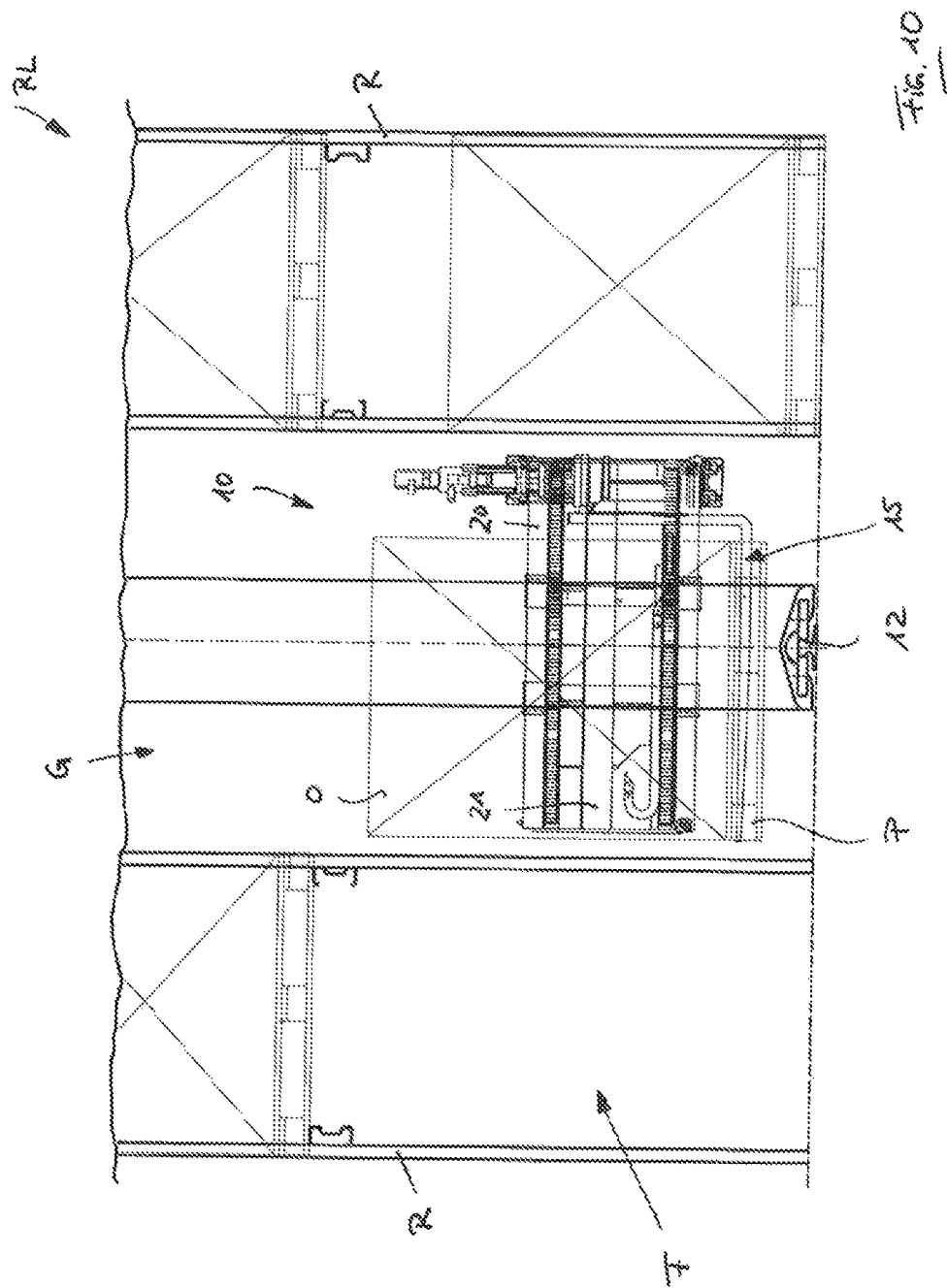

STORAGE AND RETRIEVAL UNIT AND METHOD FOR RETRIEVING AN OBJECT FROM A SHELF OF A SHELF STORAGE SYSTEM

This nonprovisional application is a continuation of International Application No PCT/EP2021/078749, which was filed on Oct. 18, 2021, and which claims priority to German Patent Application No 10 2020 127 921.3, which was filed in Germany on Oct. 23, 2020, and which are both herein incorporated by reference.

BACKGROUND OF THE INVENTION

Field of the Invention

The invention relates to a storage and retrieval unit having a carriage which can be moved along a linear guide arranged on a floor in a shelf aisle in the direction of an X axis, and which supports a vertical mast which extends perpendicular to the X axis in the direction of a vertical Y axis, and having a load receiver which is mounted by one end only on a support device, wherein the load receiver can be moved vertically together with the support device along the mast, and can be moved into a shelf compartment in the direction of a Z axis which runs perpendicular to the X axis and perpendicular to the Y axis.

In addition, the invention relates to a method for retrieving an object from a shelf compartment of a shelf storage system which has a plurality of shelves arranged next to one another with a spacing, with a shelf aisle extending between the shelves.

Description of the Background Art

Changing consumer behavior has resulted in ever more goods being ordered on the Internet, which must then be delivered quickly by a logistics service provider. For this purpose, a very large number of products and goods must be kept available; this means that a large number of shelf storage systems is necessary. A shelf storage system has a plurality of shelves arranged next to each other with a spacing. A shelf aisle is formed between two adjacent shelves, and this shelf aisle is traveled by an automated storage and retrieval unit. By means of the storage and retrieval unit, a desired object, for example a container or a loaded pallet, can be automatically removed from a shelf compartment and moved to a transfer space formed in front of the shelf aisles.

Logistics service providers and medium-sized production companies usually operate small to medium-size storage facilities, which are manually serviced by means of a forklift truck. Changes in logistics processes, in conjunction with demographic shifts in society, makes the operation of these manually-serviced storage facilities increasingly uneconomical. Constructing a new, automated warehouse is usually not an acceptable alternative due to insufficient space, or because it is difficult to meet regulatory requirements. For this reason, the adaptation of existing storage facilities or the use of existing buildings and their installations with automated storage solutions is increasingly becoming the norm.

All shelf storage systems which are manually serviced with forklift trucks have in common that objects or loads are stored at the level of the floor in the lower shelf compartments. An approach to automation which continues to use the existing shelves is possible only in a meaningful manner if the number of storage rack spaces is largely preserved. This requires the automated storage and retrieval unit to be able to retrieve and set down objects or transport units close towards the floor or floor level.

In this case, however, there is the problem that, with old shelf storage systems, the shelf aisles formed between two adjacent shelves are too narrow to receive a storage and retrieval unit operating on both sides. In particular during the process of retrieving loads or objects from the lower compartments of each shelf, the problems arise that the load receiver, for example a forklift, cannot be pulled back at the floor level far enough that it is positioned in front of the pallet in the lower compartment of the shelf and can be inserted into the pallet. This is due in particular to the fact that a guide rail is present on the floor of the shelf aisle. The guide rail guides the storage and retrieval unit during its movement along the shelf aisle, and the overall height of the guide rail impedes the movement of the load receiver.

SUMMARY OF THE INVENTION

It is therefore an object of the present invention to provide a storage and retrieval unit, by means of which an object or a load can be retrieved from a lower shelf compartment near or on the floor, even in narrow shelf aisles.

This object is achieved by a storage and retrieval unit according to an exemplary embodiment of the invention, whereby it is provided that the load receiver can be pivoted about a pivot axis $X_1$ running parallel to the X axis in such a way that it can be brought into a position inclined downward towards the floor, in which position a front free end of a load receiver that is remote from the support device is arranged lower than a rearward end of the load receiver close to the support device.

This approach is useful in particular in cases where a guide rail for the storage and retrieval unit is arranged on the floor of a shelf aisle and protrudes upward, such that the rearward end of the load receiver is arranged at a distance from the floor of the shelf aisle above the guide rail.

The invention is based on the basic consideration that the movement of a load receiver, which is usually moved horizontally and in the direction of the Z axis into a shelf compartment and pulled out of the shelf compartment, requires less space in the direction of the width of the shelf aisle if the load receiver is brought into a position inclined at an angle downward towards the floor. To accommodate a load or an object from a lower shelf compartment close to the floor, the load receiver is placed at an angle so that its front, free ends are arranged, for example, in front of the insertion openings of the pallet carrying the load, while at the same time the rearward end of the load receiver assigned to the support device is raised, and preferably positioned above the guide rail fastened to the floor. By combining a pivoting movement about the pivot axis $X_1$ running parallel to the X axis with a lifting or lowering movement in the direction of the vertical Y axis and an insertion movement into the shelf compartment in the direction of the Z axis, the load receiver can be inserted into the shelf compartment or the pallet arranged therein on a curved movement path. With such an embodiment, it is possible to stock the lower shelf compartments of the shelves even in relatively narrow shelf aisles without the central guide rail arranged in the shelf aisle hindering the movement of the load receiver.

The load receiver can be, for example, a fork with at least two prongs, wherein the rearward end of the fork is fastened to the support device. The prongs run in a known manner with a spacing, parallel to one another, and are in particular oriented in a straight line, or are pre-tensioned in such a way that they only run in a straight line once they are loaded.

It can also be provided that the support device together with the load receiver can be displaced along a transverse guide in the direction of the Z axis and can pivot about the pivot axis $X_1$. This allows the load receiver to be inserted into a shelf compartment and pulled back out.

In order to bring the load receiver into the angled position, it can be provided that the transverse guide can be mounted on the carriage on a guide part which is pivotable about the pivot axis $X_1$ running parallel to the X axis. When the guide part is pivoted about the pivot axis $X_1$, the transverse guide and the support device are thus also pivoted together with the load receiver. In this way, the inclined position, in which the load receiver extends at an angle downwards from the center of the shelf aisle to one of the sides of the shelf aisle, can be set in a simple manner for the load receiver.

The pivoting movement of the guide part about the pivot axis $X_1$ can be superimposed by means of a controller on a lifting or lowering movement in the direction of the vertical Y axis and the displacement movement of the support device and the load receiver along the transverse guide, in such a way that the load receiver can be moved along an at least partially curved path of movement out of its inclined position in the shelf aisle upon its insertion into the shelf compartment into a horizontal receiving position. The horizontal receiving position is at least reached when the load receiver is positioned below the object to be received and picks up the object by subsequently lifting it vertically. The curved path of movement can be at least partially a continuous and differentiable curve, i.e., a continuous curve without inflection points or deflections. Alternatively, the curved path of movement can have at least some inflection points or can be composed of straight and/or curved portions in the manner of a polygon.

The storage and retrieval unit according to the invention has the further advantage that it is possible to perform a deflection compensation of the load receiver. The load receiver is typically mounted by only one end. When it is brought under a relatively heavy load and then the load is raised, the weight of the load causes the load receiver to deflect like a beam held on one end. Since the load rests on the load receiver, the load is also inclined. This inclination of the load can be compensated for a pivoting movement of the guide part about the pivot axis $X_1$, such that the load is then oriented again in the desired manner—and in particular, horizontally. In a corresponding orientation, the load can be reliably removed from the shelf compartment.

The support device can have a fork carriage connected to the load receiver and a thrust part mounted displaceably on the guide part, wherein the fork carriage can pivot relative to the thrust part about an axis of rotation $Y_1$ running parallel to the vertical Y axis. This embodiment makes it possible to rotate the load receiver within the shelf aisle, or in a space formed outside the shelf aisle, about a vertical axis, and thus to orient it in the desired manner.

In order to facilitate the insertion of the load receiver under a load in particularly narrow shelf aisles when the load is positioned in the lower shelf compartment and/or on the floor, it can be provided in a refinement of the invention that the load receiver can have a rear support portion fastened to the support device, and a front, second support portion, which are connected to one another in an articulated manner. The relative movement between the first support portion and the second support portion is preferably limited by corresponding stops in such a manner that a maximum angle of 180°, and thus a smooth continuous transition, is formed on the upper side of the load receiver and/or on the upper sides of the first support portion and the second support portion. However, this angle can be reduced by pivoting the second support portion relative to the first support portion, thereby facilitating the insertion of the front end of the load receiver and thus of the second support portion into the region below the load to be received.

The method relates to the retrieval of an object from a shelf compartment of a shelf storage system which has a plurality of shelves arranged next to one another with a spacing, wherein a shelf aisle extends between the shelves, and wherein a storage and retrieval unit with the aforementioned construction is preferably used for the method. To retrieve the object, the load receiver is positioned in the shelf aisle next to the shelf compartment in which the object to be retrieved is located. The load receiver is brought into the inclined position, in which the free end of the load receiver close to the object to be received is arranged lower than the rearward end of the load receiver remote from the object. Subsequently, the load receiver is inserted into the shelf compartment under the object to be retrieved along a path of movement which is curved at least partially, and preferably along its entire length, by superimposing a pivoting movement about the pivot axis $X_1$ running parallel to the X axis with a lifting or lowering movement in the direction of the vertical Y axis and an insertion movement into the shelf compartment in the direction of the Z axis, and the load receiver is subsequently lifted together with the object and pulled out of the shelf compartment together with the object.

The storage of an object into a corresponding shelf compartment takes place in the reverse order and is expressly included by the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 7 shows the storage and retrieval unit in a fourth phase of the retrieval of the object from the shelf compartment, FIG. 8 shows the storage and retrieval unit in a fifth phase of the retrieval of the object from the shelf compartment, FIG. 9 shows the storage and retrieval unit in a sixth phase of the retrieval of the object from the shelf compartment, and FIG. 10 shows the storage and retrieval unit with the object retrieved.

DETAILED DESCRIPTION

Figure 1:
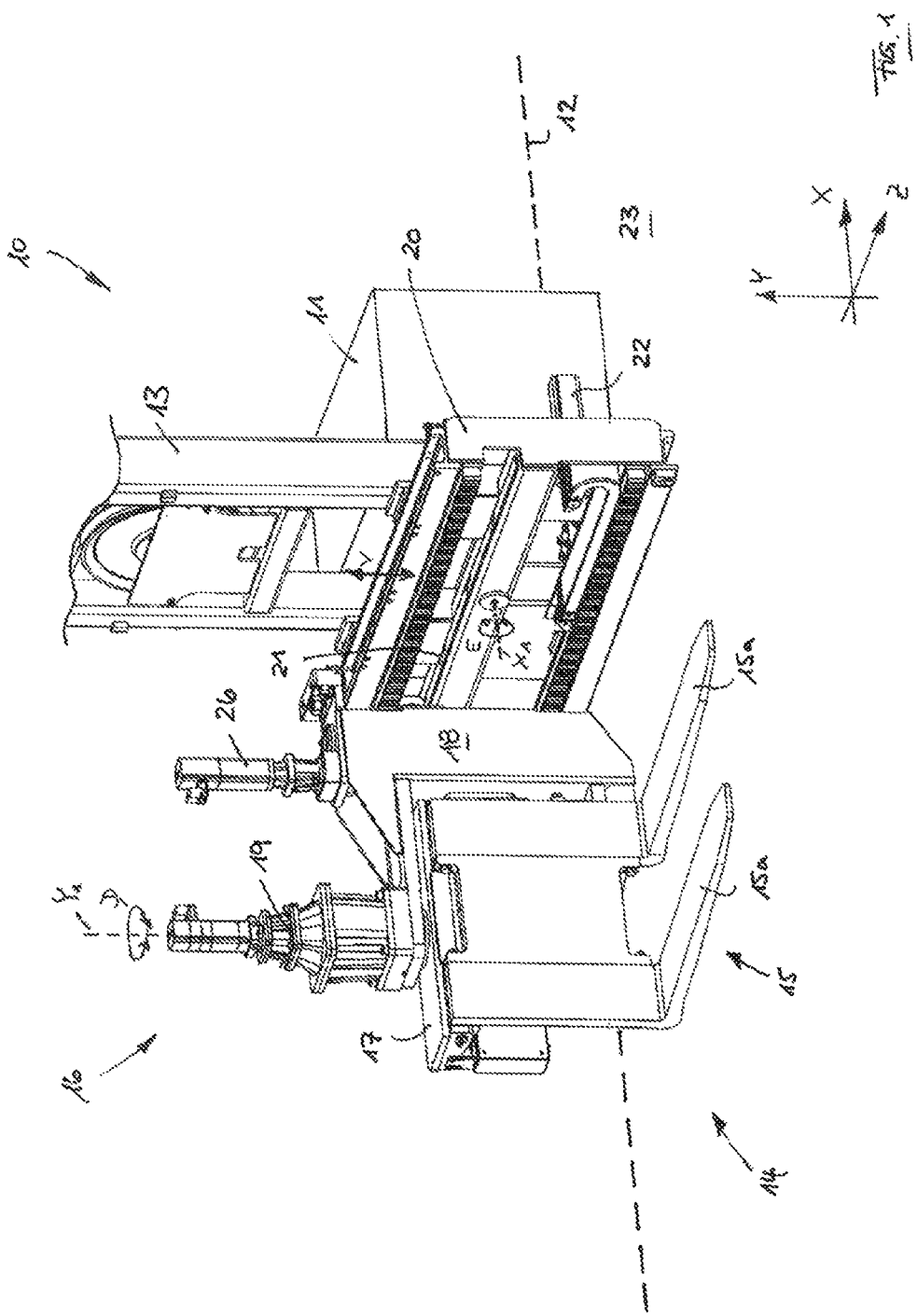
FIG. 1 shows a perspective view of the lower region of a storage and retrieval unit according to the invention.

FIG. 1 shows the lower region of a storage and retrieval unit 10, which has a carriage 11 which is only schematically indicated, and which can be moved along a guide 12, for example a guide rail—likewise indicated only schematically—in the direction of an X axis. The guide 12 is arranged on a floor 23 of a shelf aisle G (see FIG. 4).

The storage and retrieval unit 10 has a vertical mast 13, which extends perpendicular to the X axis in the direction of a vertical Y axis. A block-like or housing-like guide part 20 which can be moved vertically along the mast 13 as indicated by the double arrow V is mounted on the mast 13. The guide part 20 can also pivot with respect to the mast 13 about a pivot axis $X_1$ which extends parallel to the X axis, by means of a pivot drive 22. The pivotability of the guide part 20 relative to the mast 13 is indicated by the double arrow E.

A linear transverse guide 21 is formed on the guide part 20, and extends in the direction of a Z axis, which extends perpendicular to the X axis and perpendicular to the Y axis, and thus typically extends in the transverse direction of the shelf aisle G.

A support device 16 has a fork carriage 17 and a thrust part 18. The thrust part 18 engages in the transverse guide 21 of the guide part 20 and is displaceable relative to the guide part 20 by means of a thrust drive 26 along the transverse guide 21 and thus in the direction of the Z axis. At the end of the thrust part 18 facing away from the guide part 20, the fork carriage 17 is connected in an articulated manner to the thrust part 20. The fork carriage 17 can be rotated about a vertical axis of rotation $Y_1$ by means of a rotary drive 19 relative to the thrust part 18, as indicated by the double arrow D. The axis of rotation $Y_1$ runs parallel to the Y axis.

A load receiver 14 in the form of a fork 15 is fastened to the fork carriage 17, said load receiver having two fork prongs 15a arranged parallel or substantially parallel to each other with a spacing, which extend in the state shown in FIG. 1 in the direction of the Z axis and are mounted on only one end to the fork carriage 17.

Figure 2:
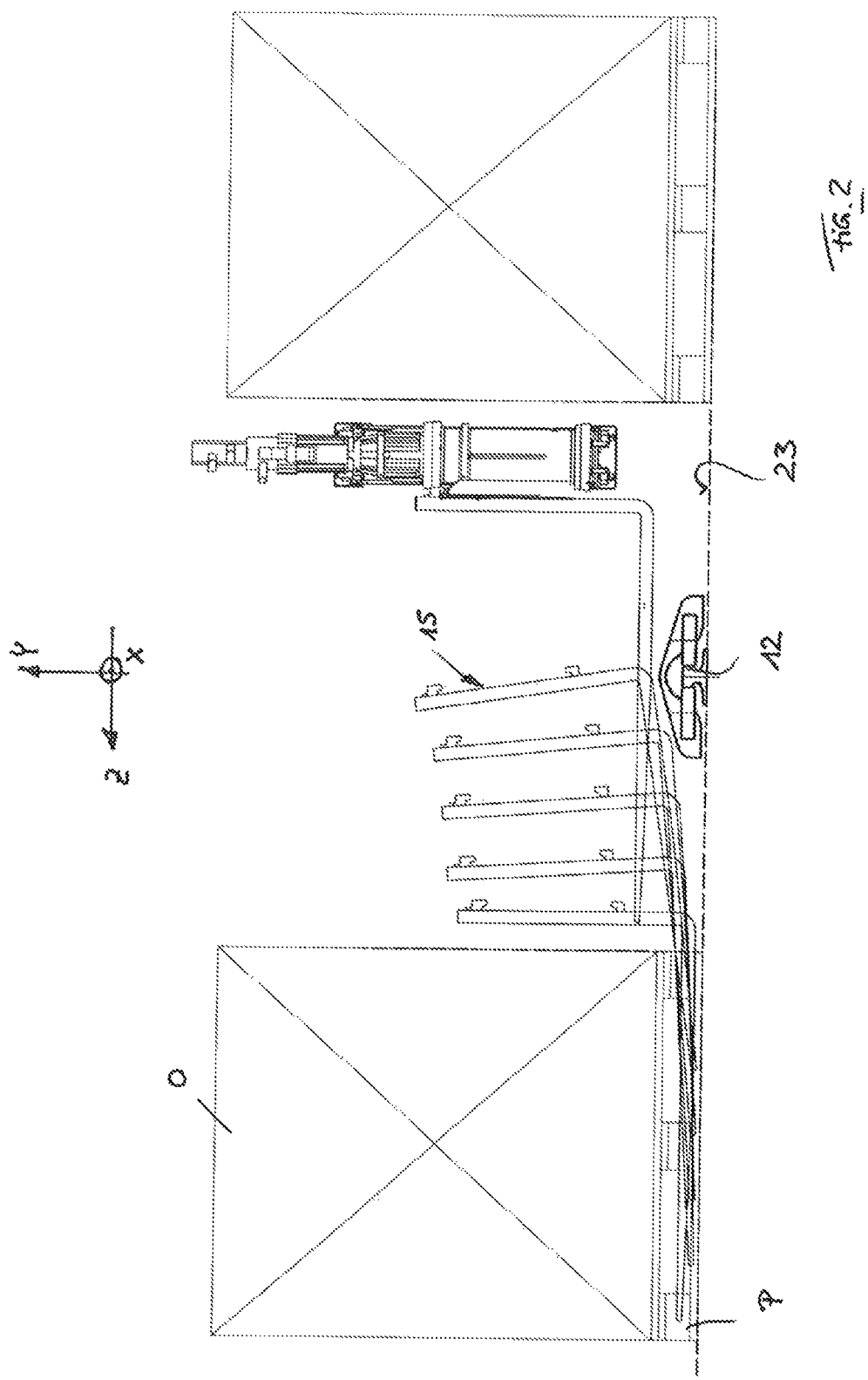
FIG. 2 shows a different positioning of the load receiver during the insertion movement under the object to be received.

FIG. 2 shows, in a schematic side view, the individual phases of an insertion movement of the fork 15 of the storage and retrieval unit under an object O to be received, which object is stored on the floor on a pallet P.

The fork 15 is initially located in a starting position shown at right in FIG. 2, in which it is arranged above the guide 12 and in which the prongs 15a extend substantially horizontally. The fork 15 is then brought, by pivoting the guide part 20 (not shown in FIG. 2), into a position inclined at an angle downward toward the floor 23, and is pushed in the direction of the Z axis and thus in the direction of the object O, wherein the front ends of the prongs 15a enter the pallet P.

Preferably, when the fork 15 is arranged above the guide 12 and, in particular, when it is arranged on the side thereof, the fork 15 is lowered in the direction of the floor 23, and brought by pivoting the guide part 20 back into a horizontal orientation in which the prongs 15a are arranged completely or at least largely inside the pallet P and below the object O. The adjustment of the fork 15 preferably takes place on a continuous and differentiable curved path of movement, i.e., without inflection points or bends.

Figure 3:
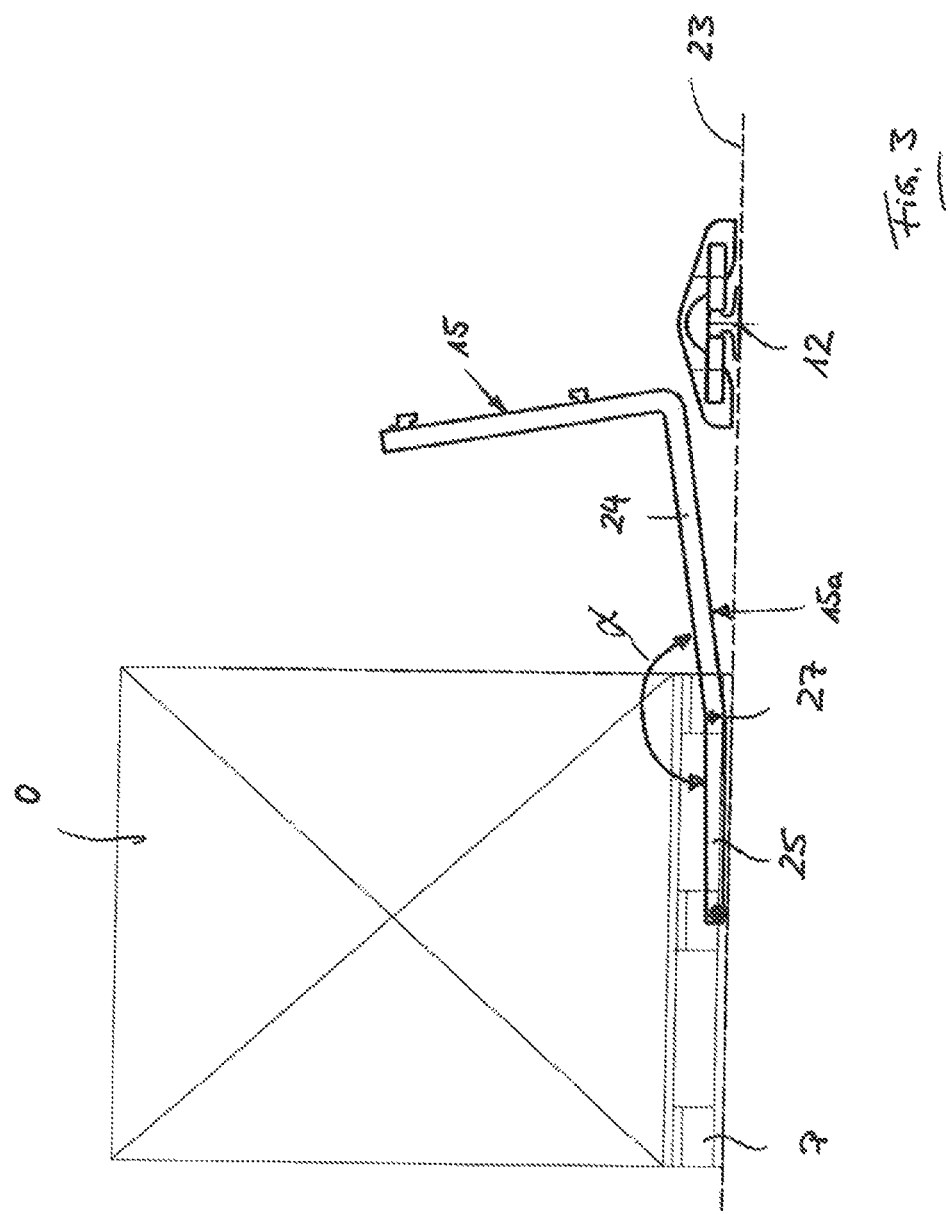
FIG. 3 shows an alternative embodiment of the load receiver.

FIG. 3 shows a refinement of the fork 15, which can be fastened to the fork carriage 17 in the usual manner. The fork prongs 15a are divided into two portions, namely a rear first support portion 24 and a front, second support portion 25, wherein the first support portion 24 and the second support portion 25 are connected to one another in an articulated manner via a joint 27. The front, second support portion 25 can thus be angled relative to the first support portion 24, wherein an angle $\alpha$ is formed between the upper side of the first support portion 24 and the upper side of the second support portion 25. In this case, it is ensured, for example by stops, that the angle $\alpha$ is not greater than 180°, i.e., the front, second support portion 25 is either in alignment with the rear first support portion 24 ($\alpha=180°$) or angled upward relative to the rear first support portion 24 ($\alpha<180°$). Due to the ability of the second support portion 25 to bend relative to the first support portion 24, the front end of the fork prong 15a can be inserted even more easily into the pallet P carrying the object to be received, as can be seen from FIG. 3.

Figure 4:
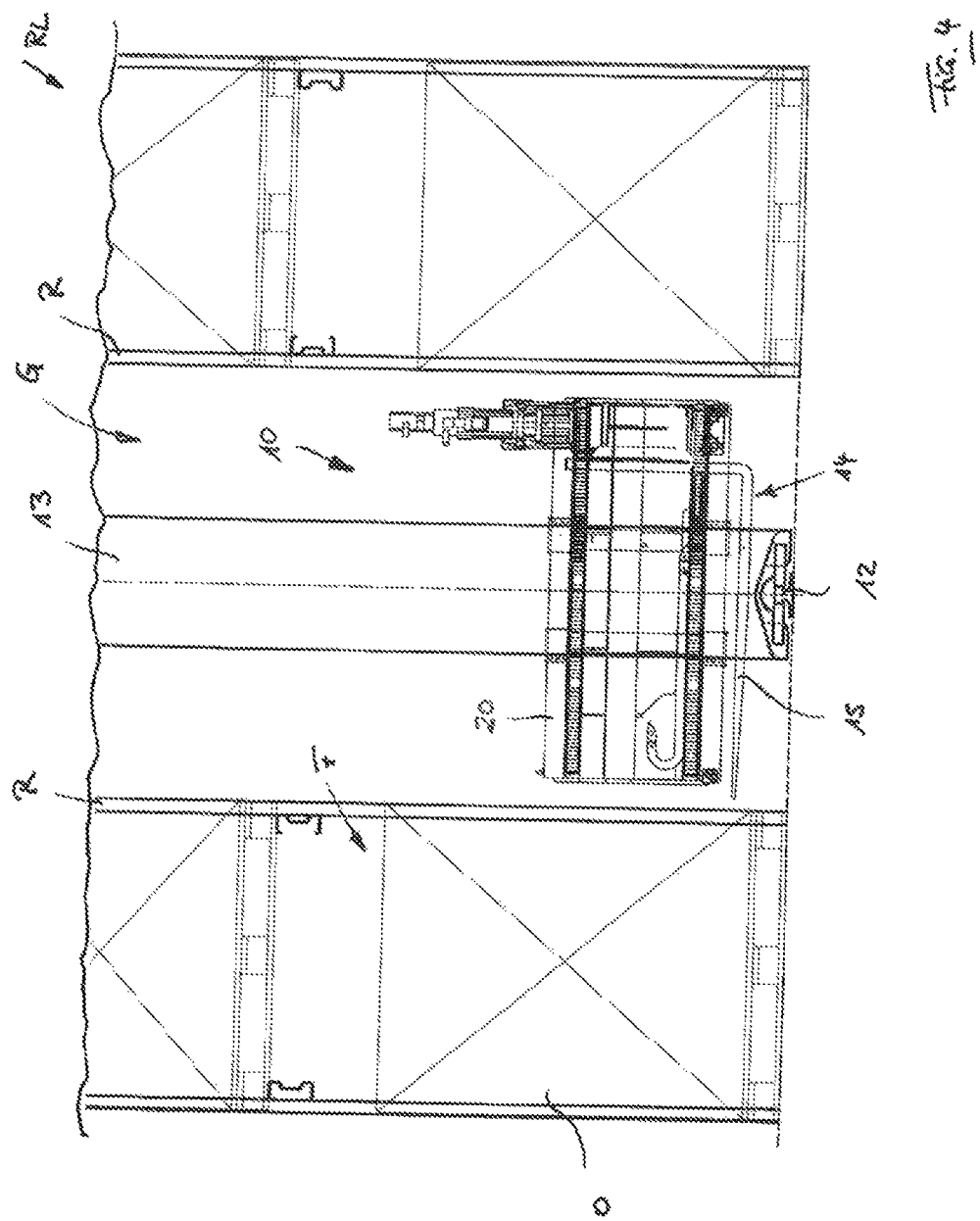
FIG. 4 shows the storage and retrieval unit in a first phase of the retrieval of an object from a shelf compartment.

FIGS. 4 to 10 show the individual phases of the retrieval of an object O from a shelf compartment F of a shelf storage system RL. The shelf storage system RL has a plurality of shelves R arranged next to one another with a spacing, wherein a shelf aisle G extending perpendicular to the drawing plane according to FIG. 4 is provided between the shelves R. A guide 12 extending along the shelf aisle G is arranged in the shelf aisle G. A storage and retrieval unit 10, which can have the previously described structure, can be moved along the guide 12. First, the storage and retrieval unit 10 is positioned with its load receiver 14 and/or its fork 15 in the shelf aisle G next to that shelf compartment F in which the object O to be retrieved is located. The fork 15 is arranged above the guide 12, with its prongs 15a oriented substantially horizontally. This state is shown in FIG. 4.

Figure 5:
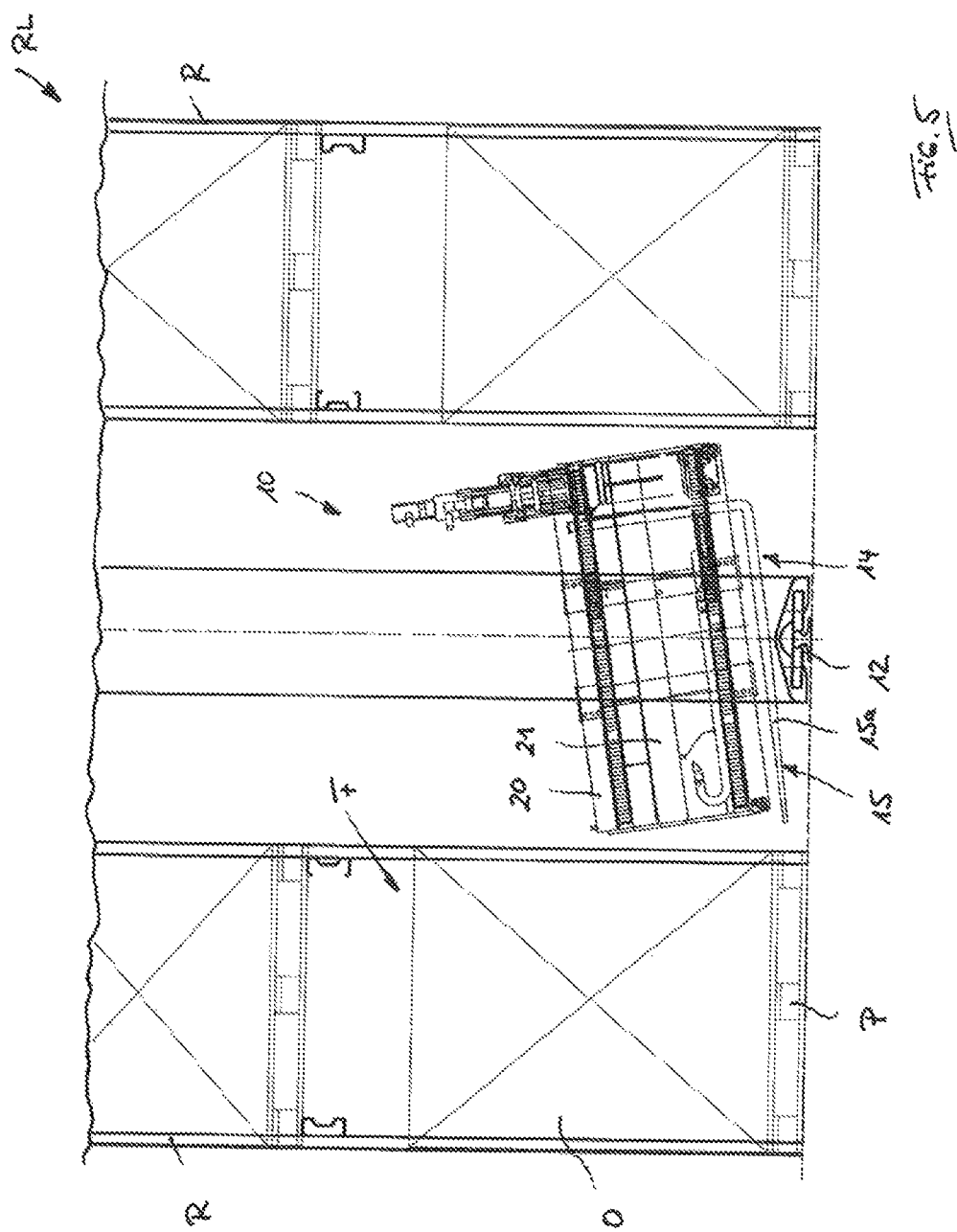
FIG. 5 shows the storage and retrieval unit in a second phase of the retrieval of the object from the shelf compartment.
Figure 6:
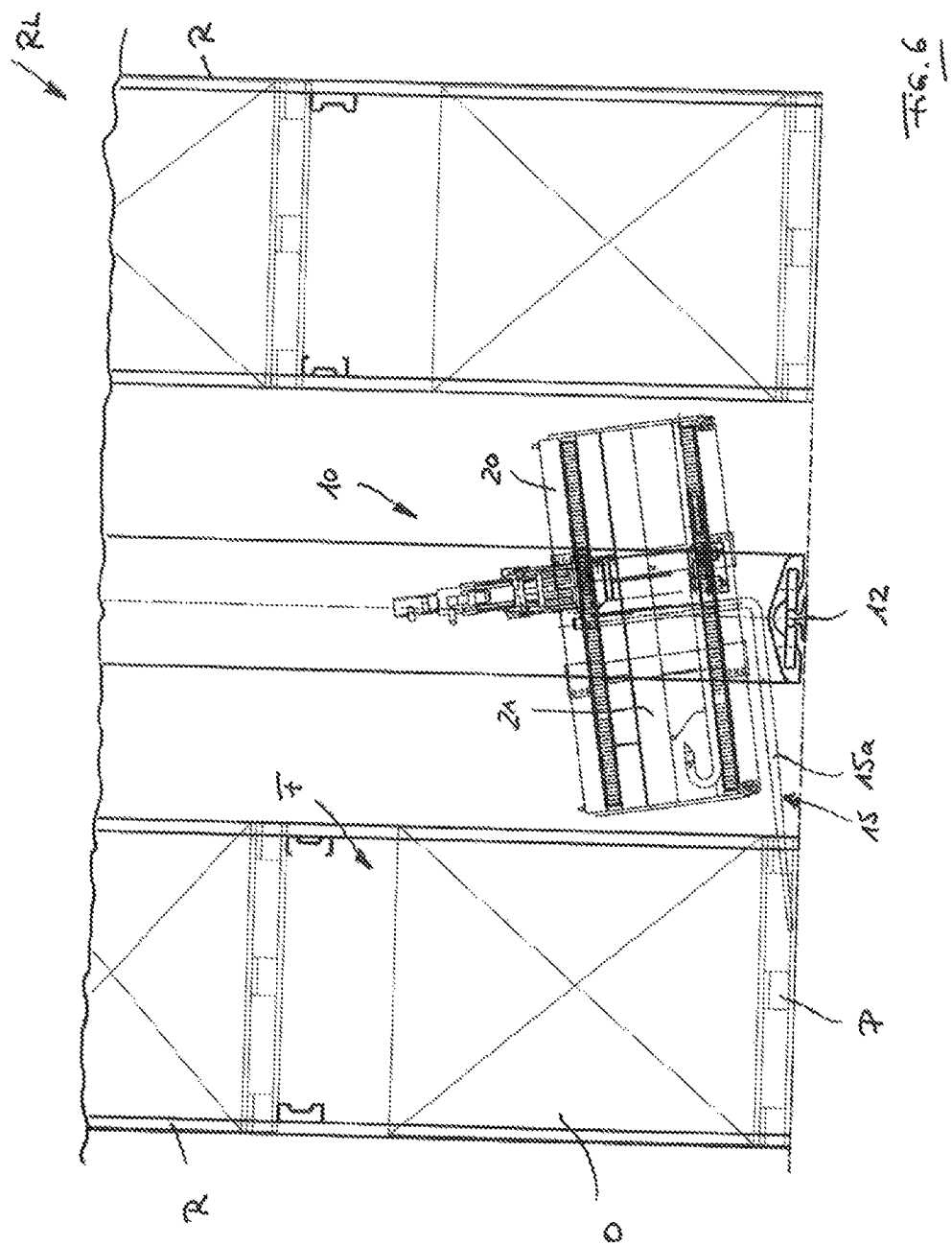
FIG. 6 shows the storage and retrieval unit in a third phase of the retrieval of the object from the shelf compartment.

The load receiver 14 and/or the fork 15 is then brought into an inclined position, in which the free end of the fork prongs 15a close to the object O to be received is arranged lower than the rearward end of the prongs 15a remote from the object O. This state is shown in FIG. 5. The fork 15 is then moved along the transverse guide 21 of the guide part 20 until the front ends of the prongs 15 enter the pallet P supporting the object O to be received. This state is shown in FIG. 6.

In the further course of the retrieval process of the object O, the pivoting movement of the guide part 20 about the pivot axis $X_1$ running parallel to the X axis is then superimposed with the linear insertion movement of the fork 15 into the pallet P in the direction of the Z axis (see FIG. 7), until the prongs 15a of the fork 15 are arranged in a horizontal orientation inside the pallet P below the object O to be received, as shown in FIG. 8.

The guide part 20 is then raised along the mast 13, such that the fork 15 and with it the pallet P and the object O arranged thereon are also lifted, as shown in FIG. 9. The fork 15 is then pulled back along the transverse guide 21 of the guide part 20 until the received object O is located within the shelf aisle G, as shown in FIG. 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A storage and retrieval unit comprising:
a carriage that is displaceable along a linear guide arranged on a floor in a shelf aisle in a direction of an X axis, the carriage supporting a vertical mast that extends substantially perpendicular to the X axis in a direction of a vertical Y axis; and
a load receiver mounted by only one end on a support device, the load receiver being adapted to be moved vertically together with the support device along the mast and adapted to be moved into and out of a shelf compartment in a direction of a Z axis that runs substantially perpendicular to the X axis and substantially perpendicular to the Y axis,
wherein the load receiver is adapted to be pivoted about a pivot axis running substantially parallel to the X axis such that the load receiver is brought into a position inclined downward towards the floor, in which position a front free end of the load receiver that is remote from the support device is arranged lower than a rearward end of the load receiver that is close to the support device,
wherein the support device together with the load receiver is displaceable along a transverse guide in the direction of the Z axis and is pivotable about the pivot axis,
wherein the transverse guide is formed on a guide part that is pivotable on the carriage about the pivot axis running substantially parallel to the X axis, and
wherein a pivoting movement of the guide part about the pivot axis in a direction of the vertical Y axis is superimposed with a lifting or lowering movement, and a displacement movement of the support device and of the load receiver along the transverse guide is superimposed, via a controller, such that the load receiver is adapted to be moved along an at least partially curved path of movement from an inclined position within the shelf aisle into a horizontal receiving position below an object to be retrieved when the load receiver is moved into the shelf compartment.

2. The storage and retrieval unit according to claim 1, wherein the load receiver has a fork with at least two prongs, and wherein a rearward end of the fork is fastened to the support device.

3. The storage and retrieval unit according to claim 1, wherein the at least partially curved path of movement is continuous and differentiable.

4. The storage and retrieval unit according to claim 1, wherein the support device has a fork carriage connected to the load receiver and a thrust part mounted displaceably on the guide part, and wherein the fork carriage is pivotable relative to the thrust part about an axis of rotation running substantially parallel to the vertical Y axis.

5. A storage and retrieval unit comprising:
a carriage that is displaceable along a linear guide arranged on a floor in a shelf aisle in a direction of an X axis, the carriage supporting a vertical mast that extends substantially perpendicular to the X axis in a direction of a vertical Y axis; and
a load receiver mounted by only one end on a support device, the load receiver being adapted to be moved vertically together with the support device along the mast and adapted to be moved into and out of a shelf compartment in a direction of a Z axis that runs substantially perpendicular to the X axis and substantially perpendicular to the Y axis,
wherein the load receiver is adapted to be pivoted about a pivot axis running substantially parallel to the X axis such that the load receiver is brought into a position inclined downward towards the floor, in which position a front free end of the load receiver that is remote from the support device is arranged lower than a rearward end of the load receiver that is close to the support device, and
wherein the load receiver has a rear first support portion fastened to the support device and a front, second supporting portion, which are connected to one another with articulation.

6. A method for retrieving an object from a shelf compartment of a shelf storage system comprising a plurality of shelves arranged next to each other with a spacing, with a shelf aisle extending between the shelves or with a storage and retrieval unit according to claim 1, the method comprising:
positioning the load receiver in the shelf aisle next to the shelf compartment in which the object to be retrieved is located;
moving the load receiver an inclined position, in which a free end of the load receiver that is close to the object to be received is arranged lower than a rearward end of the load receiver that is remote from the object;
inserting the load receiver, along an at least partially curved path of movement, into the shelf compartment under the object to be received, with a pivoting movement about the pivot axis running substantially parallel to the X axis being superimposed with a lifting or lowering movement in the direction of the vertical Y axis, and with an insertion movement into the shelf compartment in the direction of the Z axis; and
lifting the load receiver together with the object and pulling the load receiver with the object out of the shelf compartment.

* * * * *